United States Patent
Lee

(10) Patent No.: US 6,675,944 B2
(45) Date of Patent: Jan. 13, 2004

(54) RETURN APPARATUS FOR A CLUTCH PISTON OF AN AUTOMATIC TRANSMISSION

(75) Inventor: Chang-Wook Lee, Yongin (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/098,682

(22) Filed: Mar. 12, 2002

(65) Prior Publication Data
US 2003/0010593 A1 Jan. 16, 2003

(30) Foreign Application Priority Data
Jul. 11, 2001 (KR) .......................... 2001-41604

(51) Int. Cl.[7] ............... F16D 25/0630; F16D 13/52; F16D 25/12; F16D 48/10
(52) U.S. Cl. ............... 192/106 F; 92/130 B; 192/85 AA; 267/158
(58) Field of Search ............ 192/70.27, 70.28, 192/106 R, 106 F, 104 F, 101, 85 AA; 267/158; 92/85 A, 130 R, 130 B

(56) References Cited

U.S. PATENT DOCUMENTS

| | | | | |
|---|---|---|---|---|
| 2,966,978 A | * | 1/1961 | Kaptur | 192/106 F |
| 4,548,306 A | * | 10/1985 | Hartz | 192/70.28 |
| 4,834,229 A | * | 5/1989 | Kanazawa | 192/106 F |
| 5,913,396 A | * | 6/1999 | Hein | 192/70.28 |

FOREIGN PATENT DOCUMENTS

JP          2-17226 A   *   1/1990

* cited by examiner

Primary Examiner—Rodney H. Bonck
(74) Attorney, Agent, or Firm—Pennie & Edmonds LLP

(57) ABSTRACT

In order to minimize an effect of centrifugal force on a release operation of a clutch piston, this invention provides a return apparatus including a spring support rotating at a same speed as the clutch piston, and a return spring abutted at an end against the spring support and exerting an elastic force on the clutch piston, the elastic force increasing as the clutch piston rotating speed increases.

6 Claims, 3 Drawing Sheets

RETURN APPARATUS FOR A CLUTCH PISTON OF AN AUTOMATIC TRANSMISSION

FIELD OF THE INVENTION

The present invention relates to a clutch of an automatic transmission, and more particularly, to a return apparatus of a clutch piston of an automatic transmission.

BACKGROUND OF THE INVENTION

A multi-plate clutch is structured having a plurality of alternating clutch plates and disks, and is used to transmit power in motorcycles and automatic transmissions of vehicles. The conventional multi-plate clutch assembly, with reference to FIG. 5, includes a plurality of clutch plates 104, which are mounted substantially in parallel within slots of an inner slotted portion 102 of a clutch retainer 100, and a plurality of clutch disks 110, which are mounted between the clutch plates 104 within slots of an outer slotted portion 108 of a hub 106. That is, the clutch plates 104 and the clutch disks 110 are inserted partially within the slots of the inner slotted portion 102 of the clutch retainer 100 and the outer slotted portion 108 of the hub 106, respectively.

A piston 112 is mounted in an area defined by the clutch retainer 100, and a hydraulic pressure chamber 114 is formed between the piston 112 and the clutch retainer 100. A return spring 116, which is a compression spring, is provided on a side of the piston 112 opposite to that where the hydraulic pressure chamber 114 is formed to provide a constant biasing force to the piston 112 in a direction toward the hydraulic pressure chamber 114.

With the supply of a sufficient hydraulic pressure to the hydraulic pressure chamber 114, the piston 112 overcomes an elastic force of the return spring 116 such that the piston 112 moves in a direction toward the clutch plates 104 and the clutch disks 110 to compress the same, thereby engaging the multi-plate clutch to allow for the transmission of power. If the hydraulic pressure is then exhausted from the hydraulic pressure chamber 114, the piston 112 moves in the opposite direction as a result of the biasing force of the return spring 116. This removes the force applied to the clutch plates 104 and the clutch disks 110 by the piston 112 so that the transmission of power is discontinued.

However, the exhaust of hydraulic fluid is often incomplete. That is, although the hydraulic pressure in the path between a hydraulic pressure control apparatus and the hydraulic pressure chamber 114 is fully exhausted, part of the fluid in the hydraulic pressure chamber 114 is not exhausted as a result of a centrifugal force generated by the rotation of the clutch, thereby generating a centrifugal force hydraulic pressure. In the case where the clutch is rotating at a high speed, the centrifugal force hydraulic pressure may maintain engagement of the clutch.

FIG. 5 shows two types of clutch return mechanisms according to the prior art, one of which is, as shown in an upper-half part, a balance piston type, and the other of which is, as shown in a lower-half part, a check ball type.

According to the balance piston type, a balance piston 118 is mounted inwardly from the piston 112 as shown in the upper part of the example of a conventional multi-clutch assembly of FIG. 5, and the return spring 116 is interposed between the piston 112 and the balance piston 118. Also, an opposing hydraulic pressure is supplied to a space between the piston 112 and the balance piston 118 such that the opposing hydraulic pressure enables the piston 112 to return.

According to the check ball type, with reference to the lower part of the example of a conventional multi-clutch assembly of FIG. 5, a check ball 120 is mounted at an outer extremity portion of the piston 112, with this area of the piston 112 and the adjacent member being formed in such a manner as to allow operation of the check ball 120. Various forces act on the check ball 120 including the force of the hydraulic pressure, centrifugal force resulting from the rotation of the multi-plate clutch, and a buoyancy force provided by the fluid used to create hydraulic pressure. If a rotational speed of the clutch is increased, the centrifugal force acting on the check ball 120 overcomes the centrifugal force hydraulic pressure to create the flow of fluid, that is, to enable exhaust of the remaining fluid.

However, in the case of the first example above in which the balance piston 118 is used, to effectively offset the centrifugal force hydraulic pressure, an inner diameter of the balance piston 118 must be smaller than an inner diameter of the piston 112. As a result, the size of the transmission is increased.

Further, with respect to the application of the check ball 120, it is difficult to design the check ball 120 and maintain the quality of the same to meet the precise design parameters. It is also difficult to fabricate the check ball 120 to the precise design parameters, as the surfaces of the check ball 120 and its contacting surface must be fabricated with exactitude.

SUMMARY OF THE INVENTION

According to the present invention there is provided a return apparatus for a clutch piston of an automatic transmission which includes a return spring, the elastic force of which increases as the rotational speed of the clutch piston increases such that the clutch piston is prevented from engaging when hydraulic pressure is released. The return apparatus according to the invention further includes a spring support rotating at a same speed as the clutch piston, with the return spring abutted at an end against the spring support and exerting an elastic force on the clutch piston, the elastic force increasing as the clutch piston rotational speed increases.

The return spring of the invention preferably includes a plane spring plate curved convexly at its central portion, in a radial direction with respect to the rotation axis of the clutch piston, and a mass unit disposed at the curved central portion, where the return spring is abutted against the spring support at an end of the plane spring plate. The opposite end of the plane spring plate is connected to the clutch piston. The mass unit is, preferably, cylindrically shaped.

The return spring may also comprise a central portion having a predetermined length and mass, and a pair of elastic fins extending in a radial direction with respect to the rotation axis of the clutch piston, at a predetermined angle on opposite sides of the central portion. Also a distal end of one of the elastic fins is preferably abutted against the spring support and a distal end of the other elastic fin is abutted against the clutch piston.

In a further aspect of the invention a return spring for a clutch piston of an automatic transmission comprises a v-shaped body with a force generating mass disposed at the apex of the body. The v-shaped body has two resilient arms configured to bear in opposition against a spring support and the clutch piston. The force generating mass disposed at the apex is configured and dimensioned to exert a spreading force on the resilient arms in response to rotation of the clutch piston sufficient to overcome any centrifugal force hydraulic pressure acting on the piston. In a preferred embodiment, the force generating mass is formed integrally with the v-shaped body.

In another alternative embodiment of the invention, a clutch piston system for an automatic transmission includes a clutch piston acting on at least one clutch plate in response to applied hydraulic pressure, and centrifugal force means for returning the clutch piston to a non-acting position in response to discontinued hydraulic pressure. In a preferred embodiment, the centrifugal force means comprises support means rotating with the clutch piston and centrifugal force biasing means bearing against the support means. The centrifugal force biasing means acts on the clutch piston with increasing force proportional to rotational speed of the clutch piston. In one preferred embodiment, the centrifugal force biasing means comprises a v-shaped body and a force generating mass. The v-shaped body defines an apex and two resilient arms. The force generating mass is disposed at the apex and is configured and dimensioned to exert a spreading force on the resilient arms in response to rotation of the clutch piston sufficient to overcome centrifugal force hydraulic pressure acting on said piston.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
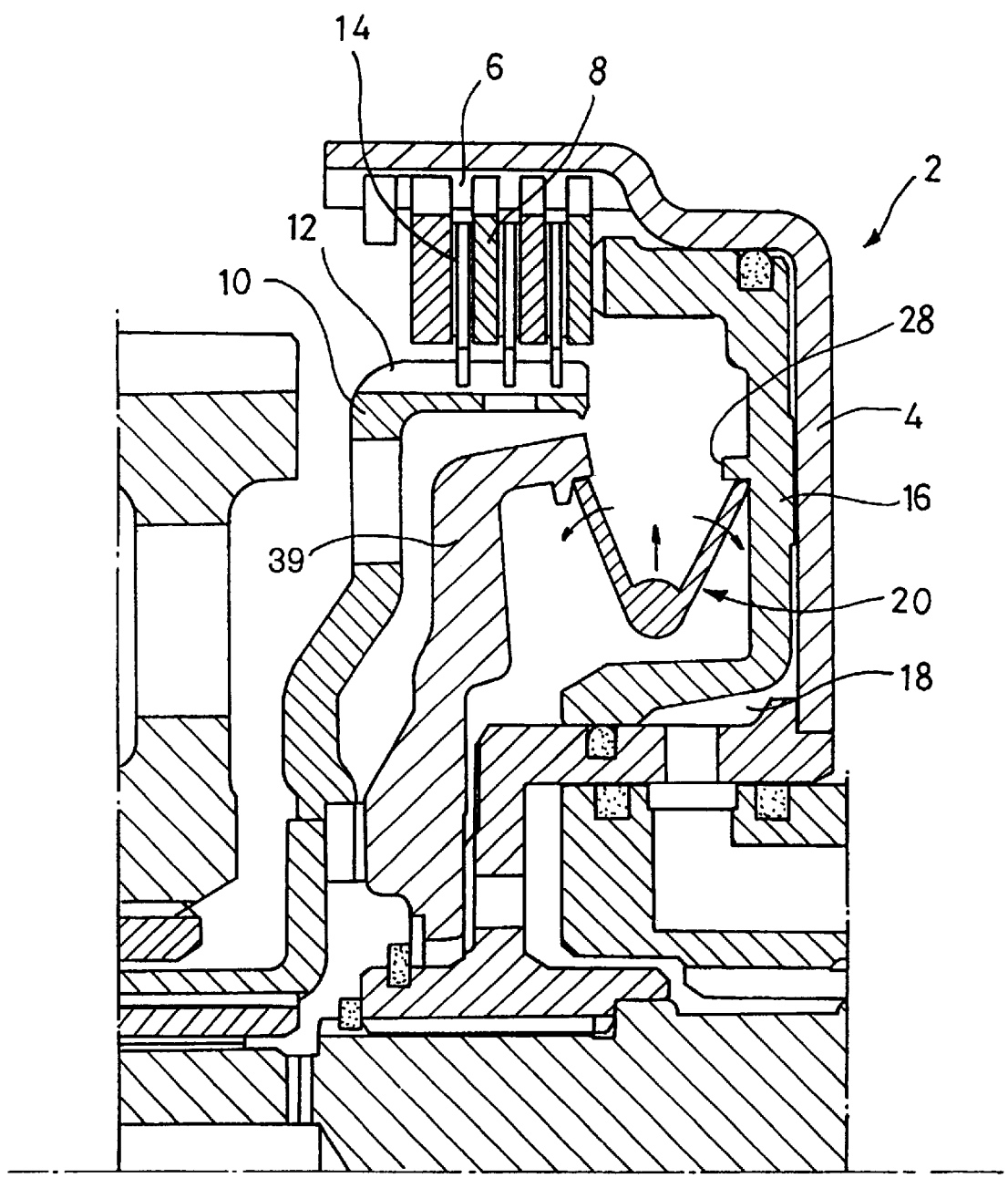
FIG. 1 is a schematic diagram of a return apparatus for a clutch piston of an automatic transmission according to a preferred embodiment of the present invention.

Referring to FIG. 1, multi-plate clutch 2 includes a plurality of clutch plates 8, which are mounted substantially in parallel within slots of an inner slotted portion 6 of a clutch retainer 4, and a plurality of clutch disks 14, which are mounted between the clutch plates 8 within slots of an outer slotted portion 12 of a hub 10. That is, the clutch plates 8 and the clutch disks 14 are inserted partially within the slots of the inner slotted portion 6 of the clutch retainer 4 and the outer slotted portion 12 of the hub 10, respectively.

A piston 16 is mounted in an area defined by the clutch retainer 4, and a hydraulic pressure chamber 18 is formed between the piston 16 and the clutch retainer 4. A return spring 20 is provided on a side of the piston 16 opposite to that where the hydraulic pressure chamber 18 is formed to constantly provide a biasing force to the piston 16 in a direction toward the hydraulic pressure chamber 18.

With the supply of a sufficient hydraulic pressure to the hydraulic pressure chamber 18, the piston 16 overcomes an elastic force of the return spring 20 such that the piston 16 moves in a direction toward the clutch plates 8 and the clutch disks 14 to compress the same, thereby engaging the multi-plate clutch to allow for the transmission of power. If the hydraulic pressure is then exhausted from the hydraulic pressure chamber 18, the piston 16 moves in the opposite direction as a result of the biasing force of the return spring 20. This removes the force applied to the clutch plates 8 and the clutch disks 14 by the piston 16 so that the transmission of power is discontinued.

Figure 2:
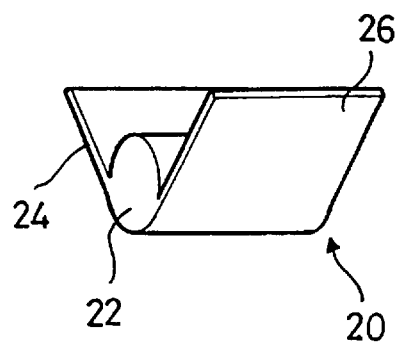
FIG. 2 is a perspective view of a return spring according to a preferred embodiment of the present invention.
Figure 3:
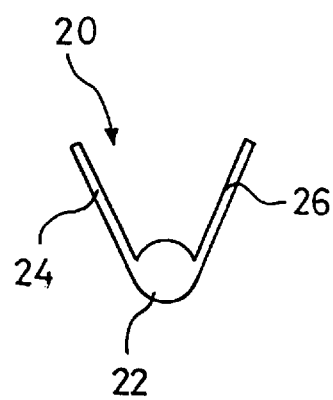
FIG. 3 is a side view of the return spring of FIG. 2.

The return spring 20, shown in greater detail in FIGS. 2 and 3, includes a central portion 22 that is cylindrically shaped and has a predetermined mass, and a pair of elastic fins 24 and 26 that are integrally formed with the central portion 22 and extend at a predetermined angle on opposite sides of the central portion 22.

The central portion 22 is not limited to a cylindrical shape and may be formed in various other configurations. Also, it is possible for the elastic fins 24 and 26 to be connected to the central portion 22, for example by a welding process, and they need not necessarily be integrally formed to the central portion 22 as described.

The pair of elastic fins 24 and 26 can be formed having a plane spring plate curved convexly at its central portion in a radial direction to a rotation axis of the piston 16, and a mass unit can be disposed at the curved central portion in order to have the central portion have the predetermined mass.

The return spring 20, referring back to FIG. 1, is mounted in the multi-plate clutch 2 as follows. With a long axis of the central portion 22 placed in a direction perpendicular to the plane created by cutting the multi-plate clutch 2 for the sectional view, a distal end of the elastic fin 24 is abutted against an undersurface of a protrusion 28 of the piston 16, and a distal end of the elastic fin 26 is abutted against a spring support 39 formed in an area defined by the hub 10 and the piston 16. The spring support 39 is formed such that the elastic fin 26 does not slip from its position where it makes contact with the spring support 39.

Figure 4:
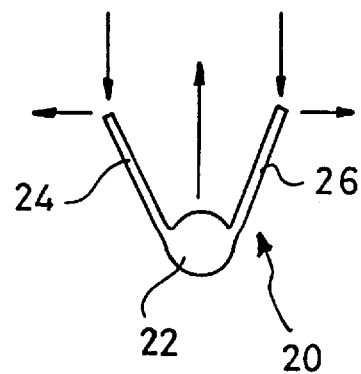
FIG. 4 is a side view of the return spring of FIG. 2 used to describe an operation of the return spring.
Figure 5:
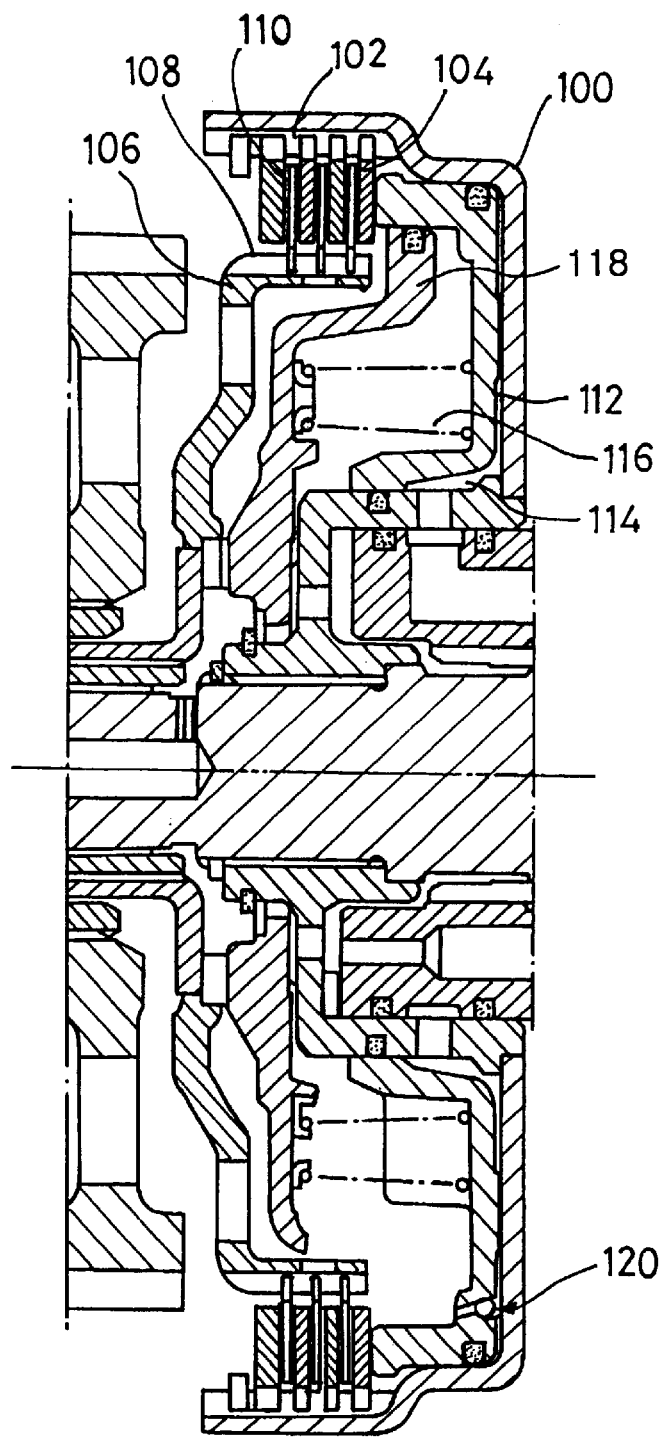
FIG. 5 is sectional views of two types of conventional return apparatus for a clutch piston of an automatic transmission.

The elastic fins 24 and 26 of the return spring 20 constantly exert a biasing force on the piston 16 in the direction of the hydraulic pressure chamber 18. Further, with reference also to FIG. 4, if the piston 16 is moved toward the clutch plates and disks 8 and 14 by supplying hydraulic pressure to the hydraulic pressure chamber 18, the elastic fins 24 and 26 are deformed to decrease a distance therebetween. This increases the elastic force exerted by the elastic fins 24 and 26 on the piston 16.

If the multi-plate clutch 2 is rotated at a high speed, the resulting centrifugal force acts as an upward force (in the drawing) on the central portion 22 of the return spring 20, and accordingly, the upward force of the central portion acts to compel the elastic fins 24 and 26 to be opened wider, which means that the biasing force of the return spring 20 is increased.

Because the biasing force of the return spring 20 increases as the centrifugal force increases, the inadvertent movement of the piston 16 toward the clutch plates 8 and clutch disks 14 is prevented and the piston 16 is sure to draw back when the hydraulic pressure is released from the hydraulic pressure chamber 18. That is, the force exerted by the elastic fins 24 and 26 during high-speed rotation of the multi-plate clutch 2 is greater than a centrifugal force hydraulic pressure resulting from fluid remaining in the hydraulic pressure chamber 18, thereby preventing movement of the piston 16 by the centrifugal force hydraulic pressure. Such a configuration of the present invention is simpler and less expensive than conventional structures using balance pistons and check balls.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A return apparatus for a clutch piston of an automatic transmission comprising:

a spring support mounted for rotation with the clutch piston;

a return spring abutted at an end against the spring support and exerting an elastic force on the clutch piston, the elastic force increasing as the clutch piston rotation speed increases wherein the return spring comprises:

a plane spring plate curved convexly at its central portion, in a radial direction with respect to a rotational axis of the clutch piston; and a mass unit disposed at the curved central portion, and wherein the return spring is abutted against the spring support at an end of the plane spring plate, and the other end of the plane spring plate is connected to the clutch piston.

2. The return apparatus of claim 1, wherein the mass unit is cylindrically shaped.

3. A return apparatus for a clutch piston of an automatic transmission comprising:

a spring support mounted for rotation with the clutch piston;

a return spring abutted at an end against the spring support and exerting an elastic force on the clutch piston, the elastic force increasing as the clutch piston rotation speed increases wherein the return spring comprises:

a central portion having a predetermined length and mass; and a pair of elastic fins formed extending in a radial direction from a rotation axis of the clutch piston at a predetermined angle on opposite sides of the central portion, a distal end of one of the elastic fins being abutted against the spring support, and a distal end of the other elastic fin being abutted against the clutch piston.

4. A return spring for a clutch piston of an automatic transmission, comprising:

a v-shaped body defining an apex and two resilient arms, said arms being configured to bear in opposition against a spring support and the clutch piston; and a force generating mass disposed at said apex, the mass being configured and dimensioned to exert a spreading force on said resilient arms in response to rotation of the clutch piston sufficient to overcome centrifugal force hydraulic pressure acting on said piston.

5. The return spring of claim 4, wherein said force generating mass is formed integrally with the v-shaped body.

6. A clutch piston system for an automatic transmission, comprising:

a clutch piston acting on at least one clutch plate in response to applied hydraulic pressure: and centrifugal force means for returning the clutch piston to a non-acting position in response to discontinued hydraulic pressure, wherein said centrifugal force means comprises:

support means rotating with the clutch piston: and centrifugal force biasing means bearing against the support means for acting on the clutch piston with force increasing as rotational speed of the clutch piston increases; and wherein said centrifugal force biasing means comprises:

a v-shaped body defining an apex and two resilient arms; and a force generating mass disposed at said apex, the mass being configured and dimensioned to exert a spreading force on said resilient arms in response to rotation of the clutch piston sufficient to overcome centrifugal force hydraulic pressure acting on said piston.

* * * * *